(12) United States Patent
Park

(10) Patent No.: US 12,424,679 B2
(45) Date of Patent: Sep. 23, 2025

(54) BATTERY MODULE ASSEMBLY

(71) Applicant: HYUNDAI MOBIS Co., Ltd., Seoul (KR)

(72) Inventor: Yun Su Park, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 836 days.

(21) Appl. No.: 17/554,751

(22) Filed: Dec. 17, 2021

(65) Prior Publication Data
US 2022/0209334 A1 Jun. 30, 2022

(30) Foreign Application Priority Data
Dec. 24, 2020 (KR) ........................ 10-2020-0183873

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/643* (2015.04);
(Continued)

(58) Field of Classification Search
CPC ............ H01M 10/613; H01M 10/643; H01M 10/6557; H01M 10/6568; H01M 50/213;
(Continued)

(56) References Cited

U.S. PATENT DOCUMENTS 10,115,943 B2  10/2018  Kim et al.
10,439,178 B2  10/2019  Morioka
(Continued)

FOREIGN PATENT DOCUMENTS

JP  2001-155702 A  6/2001
JP  6350592 B2  7/2018
(Continued)

OTHER PUBLICATIONS

Office Action issued on May 23, 2025 in Korean Patent Application No. 10-2020-0183873.

*Primary Examiner* — Lingwen R Zeng
(74) *Attorney, Agent, or Firm* — Morgan, Lewis & Bockius LLP

(57) ABSTRACT

The battery module of the disclosure includes a first cartridge which is fitted onto first electrodes of arranged battery cells and fixes parts of the battery cells, a second cartridge which is fitted onto second electrodes of the arranged battery cells and fixes the other parts of the battery cells, a first busbar housing which is coupled to the first cartridge and on which a busbar electrically connected to the first electrodes of the battery cells is seated, a second busbar housing which is coupled to the second cartridge and on which a busbar electrically connected to the second electrodes of the battery cells is seated, a first cover which covers the first busbar housing to protect the battery cells, the first cartridge, and the first busbar housing, and a second cover which covers the second busbar housing to protect the battery cells, the second cartridge, and the second busbar housing.

18 Claims, 10 Drawing Sheets

(51) Int. Cl.
- *H01M 10/643* (2014.01)
- *H01M 50/213* (2021.01)
- *H01M 50/507* (2021.01)
- *H01M 10/6557* (2014.01)
- *H01M 50/258* (2021.01)
- *H01M 50/264* (2021.01)
- *H01M 50/271* (2021.01)
- *H01M 50/514* (2021.01)

(52) U.S. Cl.
CPC ....... *H01M 50/213* (2021.01); *H01M 50/507* (2021.01); *H01M 10/6557* (2015.04); *H01M 50/258* (2021.01); *H01M 50/264* (2021.01); *H01M 50/271* (2021.01); *H01M 50/514* (2021.01); *Y02E 60/10* (2013.01)

(58) Field of Classification Search
CPC ............. H01M 50/258; H01M 50/264; H01M 50/271; H01M 50/507; H01M 50/514; Y02E 60/10

See application file for complete search history.

(56) References Cited

U.S. PATENT DOCUMENTS

| | | | |
|---|---|---|---|
| 10,847,760 | B2 | 11/2020 | Park et al. |
| 2016/0322614 | A1* | 11/2016 | Kim .................. H01M 50/505 |
| 2018/0108886 | A1 | 4/2018 | Fees et al. |
| 2018/0366701 | A1* | 12/2018 | Morimitsu ........ H01M 10/0422 |
| 2019/0148681 | A1* | 5/2019 | Park .................. H01M 50/289 |
| | | | 429/120 |
| 2020/0035967 | A1 | 1/2020 | Yoon et al. |
| 2020/0227708 | A1 | 7/2020 | Ahn et al. |

FOREIGN PATENT DOCUMENTS

| | | |
|---|---|---|
| KR | 10-2010-0135601 A | 12/2010 |
| KR | 10-2018-0004908 A | 1/2018 |
| KR | 10-1870251 B1 | 6/2018 |
| KR | 10-2066913 B1 | 2/2020 |
| KR | 10-2189332 B1 | 12/2020 |
| KR | 10-2311076 B1 | 10/2021 |

* cited by examiner

BATTERY MODULE ASSEMBLY

CROSS-REFERENCE TO RELATED APPLICATION

This application claims the benefit under 35 USC § 119(a) of Korean Patent Application No. 10-2020-0183873, filed on Dec. 24, 2020 in the Korean Intellectual Property Office, the entire disclosure of which is incorporated herein by reference for all purposes.

BACKGROUND

1. Technical Field

The present disclosure relates to a battery module assembly including a plurality of battery cells and parts for assembling the same.

2. Discussion of Related Art

Various manufacturers are manufacturing battery modules having various structures. The battery module is manufactured as an assembly type in which a plurality of basic unit battery cells (for example, cylindrical cells) are arranged to meet specifications of a predetermined voltage and a predetermined current and a battery cooling structure, a fixing member, a heat exchange member, and the like are assembled therewith.

Various features which should be considered for battery module assembly are as follows. According to a design specification, the battery module assembly is manufactured by applying all or some of the following features.
  1. Whether Battery Management System (BMS) is integrated
  2. Battery cell cooling
  3. Discharge of gas discharged from battery cell
  4. Various cooling methods—use of heat pipe including coolant
  5. Insulation performance
  6. Various cell specification implementations by combining plurality of battery cells and the like The above-described features may provide advantages of the battery module assembly but may also provide disadvantages of increasing a volume, a weight, the number of parts, and a cost, reducing productivity, and the like due to unnecessary additional elements.

SUMMARY

The present disclosure is directed to providing a battery module assembly structure, which is conventionally not present and is a new structure, in order to improve insulation and cooling performance and a degree of design freedom and to reduce a volume, a weight, the number of parts, and a cost by improving a module assembly structure.

According to the present disclosure, to solve the objectives, a battery module having an improved degree of a connection structure is provided by applying a housing having a structure allowing a busbar to be freely disposed to each of upper and lower portions of the battery cell. Specifically, according to one aspect of the present disclosure, there is provided a battery module including a first cartridge which is fitted onto first electrodes of arranged battery cells and fixes first parts of the battery cells, a second cartridge which is fitted onto second electrodes of the arranged battery cells and fixes second parts of the battery cells, a first busbar housing which is coupled to the first cartridge and on which a busbar electrically connected to the first electrodes of the battery cells is seated, a second busbar housing which is coupled to the second cartridge and on which a busbar electrically connected to the second electrodes of the battery cells is seated, a first cover which covers the first busbar housing to protect the battery cells, the first cartridge, and the first busbar housing, and a second cover which covers the second busbar housing to protect the battery cells, the second cartridge, and the second busbar housing.

The structure and the operation of the present disclosure will be clearer through specific embodiments which will be described below with reference to the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and methods of achieving the same will be clearly understood with reference to the following exemplary embodiments described in detail with the accompanying drawings. However, the present disclosure is not limited to the embodiments to be disclosed below and may be implemented in various different forms. The embodiments are provided only in order to fully describe the present disclosure and fully notify the scope of the present disclosure to those skilled in the art, and the scope of the present disclosure is defined by the appended claims. In addition, the terms used herein are provided only to describe the embodiments of the present disclosure and are not for purposes of limitation. Unless the context clearly indicates otherwise, the singular forms described in the specification include the plural forms. In addition, the terms "comprise," or "comprising," used herein are used with a meaning of specifying some stated components, steps, operations and/or elements but do not preclude the presence or addition of one or more other components, steps, operations and/or elements. Hereinafter, the exemplary embodiments of the present disclosure will be described in detail with reference to the accompanying drawings. When the embodiments are described, in a case in which specific descriptions of related known components or functions obscure the gist of the present disclosure, the specific descriptions will be omitted.

Figure 1:
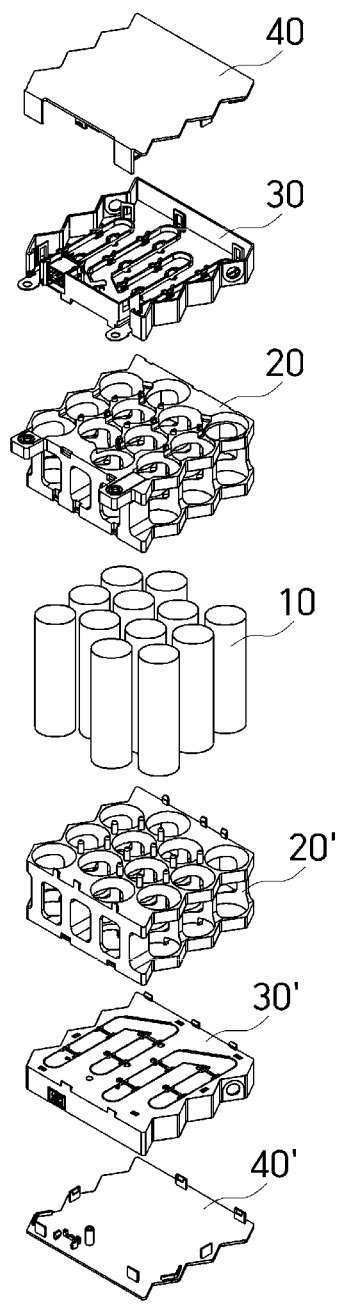
FIG. 1 is an exploded perspective view illustrating a battery module according to an exemplary embodiment of the present disclosure.
Figure 2:
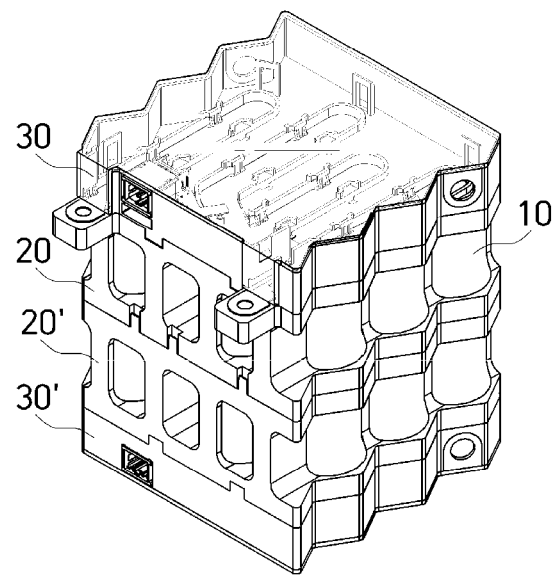
FIG. 2 is a perspective view illustrating an assembly of the battery module of FIG. 1.

FIG. 1 is an exploded perspective view illustrating a battery module according to an exemplary embodiment of the present disclosure, and FIG. 2 is a perspective view illustrating an assembly of the battery module.

The illustrated battery module includes an upper cartridge 20 which is fitted from one side (an upper portion in FIG. 1) of arranged battery cells 10 and fixes parts of the battery cells 10, a lower cartridge 20' which is fitted from the other side (a lower portion in FIG. 1) of the arranged battery cells 10 and fixes other parts of the battery cells 10, an upper busbar housing 30 which is positioned on the upper cartridge 20 and on which busbars electrically connected to one sides of the battery cells 10 are seated, a lower busbar housing 30' which is positioned under the lower cartridge 20' and on which busbars electrically connected to the other sides of the battery cells 10 are seated, an upper cover 40 which covers the upper busbar housing 30 to protect the battery cells 10, the upper cartridge 20, and the upper busbar housing 30 and serves as an upper end of the battery module, and a lower cover 40' which covers the lower busbar housing 30' to protect the battery cells 10, the lower cartridge 20', and the lower busbar housing 30' and serves as a lower end of the battery module.

FIG. 2 is the perspective view illustrating a state in which components of FIG. 1 are assembled and the upper and lower covers 40 and 40' are removed.

The embodiments of FIGS. 1 and 2 show a plurality (twelve) of cylindrical cells transversely arranged to constitute the battery cells 10. However, the battery cell 10 is not limited to a cylindrical shape. In addition, according to a design, the battery cells 10 are arranged so that polarities of the electrodes are vertically positioned differently according to a desired series and parallel structure.

Figure 3:
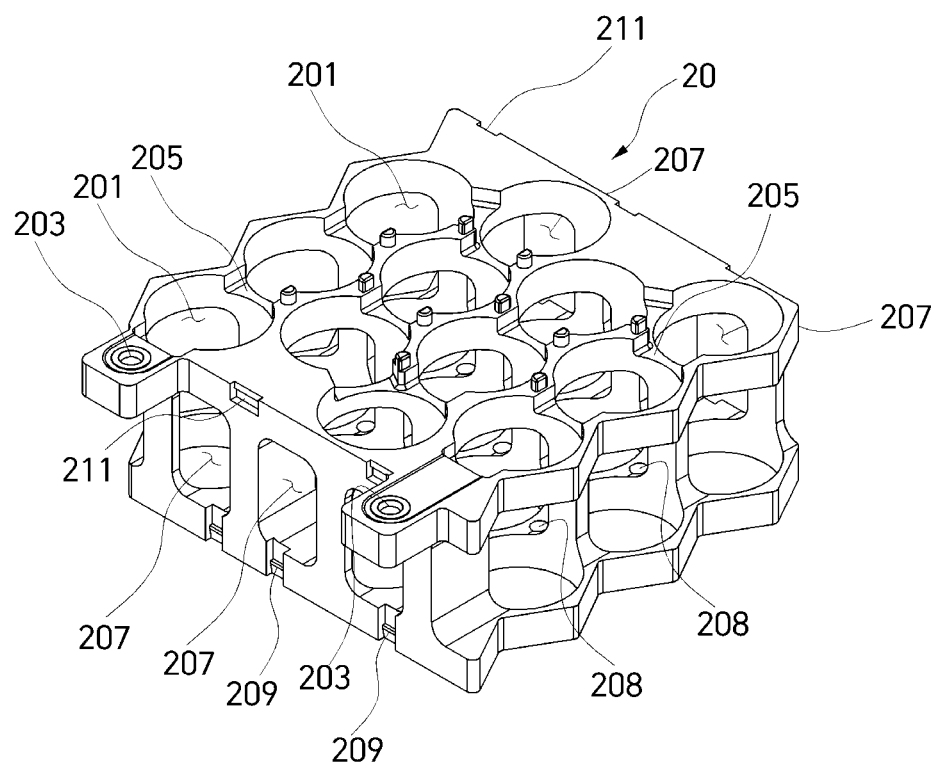
FIG. 3 is a detailed configuration diagram illustrating an upper cartridge (20)

FIG. 3 is a detailed configuration diagram illustrating the upper cartridge 20.

In order to fix the battery cells 10, pockets 201 into which the battery cells 10 are inserted are applied. The plurality of pockets 201 are formed, and the pockets 201 are also disposed in a zigzag manner to correspond to the battery cells 10 alternately arranged in a zigzag manner.

The upper cartridge 20 and other components, which will be described below, may be manufactured of plastic (preferably, a polymer material having excellent flame retardancy and insulation properties) in order to secure insulation performance and reduce a weight.

The upper cartridge 20 includes terminal blocks 203 connected to positive (+) and negative (−) end electrodes of the battery cells 10.

In addition, a coolant path 207 for cooling the battery cells 10 is formed in one or more side surfaces of the upper cartridge 20. That is, since the coolant path 207 has a horizontal transvers structure instead of a conventional vertical structure, all of the battery cells may be cooled. Since air circulates through the coolant path 207 formed in the horizontal transverse structure, that is, an inside in which the battery cells 10 are arranged, batteries may be efficiently cooled.

In addition, a structure for restricting a position of the upper cartridge 20 when the upper cartridge 20 is coupled to the lower cartridge 20' is applied. This will be described after the lower cartridge 20' is described.

Figure 4:
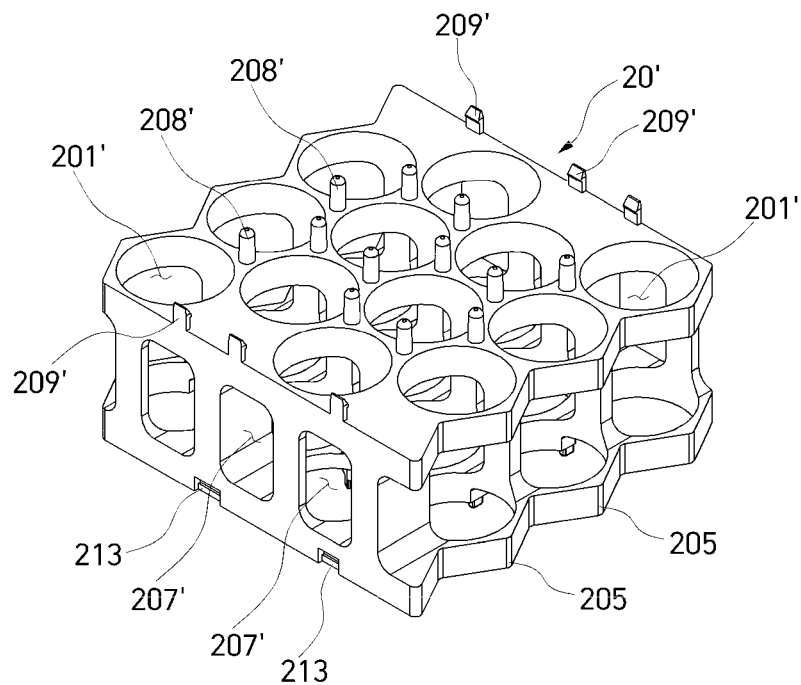
FIG. 4 is a detailed configuration diagram illustrating a lower cartridge (20')

FIG. 4 is a detailed configuration diagram illustrating the lower cartridge 20'.

The lower cartridge 20' has a substantially symmetrical structure with respect to the upper cartridge 20. However, the terminal blocks 203 are excluded. That is, pockets 201' into which the battery cells 10 are inserted are present in the lower cartridge 20', and grooves 205', in which the busbars (which will be described below) connecting the electrodes of twelve battery cells 10 are accommodated, are formed in a lower surface of the lower cartridge 20'. In addition, a coolant path 207' for cooling the battery cells 10 is formed in one or more side surfaces of the lower cartridge 20' to perform horizontal transversal cooling.

Structures for restricting positions when both are coupled are applied to an upper surface of the lower cartridge 20' and the lower surface of the upper cartridge 20. As the position restriction structures, pins and holes are used to easily arrange the positions of the upper cartridge 20 and the lower cartridge 20' when the upper cartridge 20 and the lower cartridge 20' are coupled. FIG. 4 shows pins 208' are formed at proper positions on the upper surface of the lower cartridge 20'. Conversely, holes 208 are formed at corresponding positions in the lower surface of the upper cartridge 20.

Figure 5A:
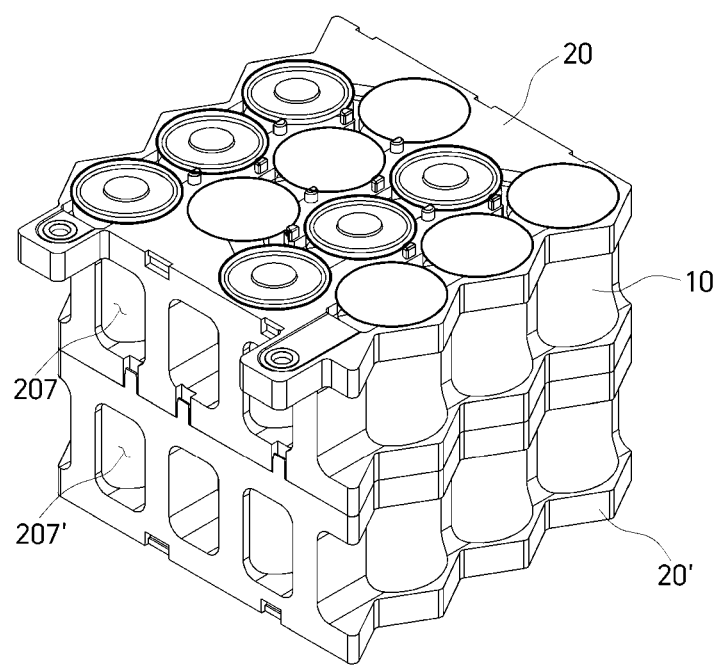
FIGS. 5A and 5B are views illustrating a shape in which battery cells (10) are inserted into pockets (201, 201') of the upper cartridge (20) and the lower cartridge (20')
Figure 5B:
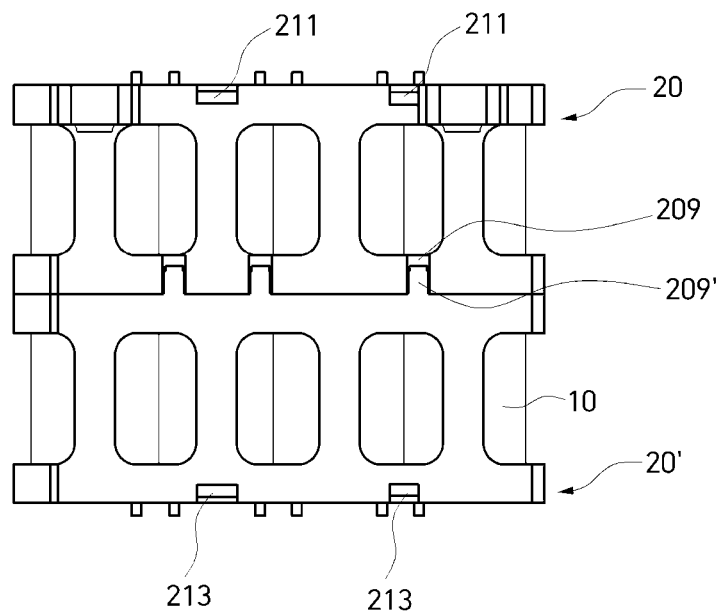

FIGS. 5A and 5B are views illustrating a shape in which the battery cells 10 are fixedly inserted into the pockets 201 and 201' of the upper cartridge 20 and the lower cartridge 20'. About half of the battery cells 10 are fixedly inserted into the upper cartridge 20, and about half of the battery cells 10 are fixedly inserted into the lower cartridge 20'.

In the side view of FIG. 5A, the coolant paths 207 and 207' formed in the side surfaces of the upper cartridge 20 and the lower cartridge 20', the holes 209 for restricting the positions which are formed in the lower surface of the upper cartridge 20, and the pins 209' for restricting the positions, which are formed on the upper surface of the lower cartridge 20', are shown. In addition, in the side view of FIG. 5B, coupling parts 211 formed on an upper surface of the upper cartridge 20 and coupling parts 213 formed on a lower surface of the lower cartridge 20' are shown. The coupling parts 211 and 213 are to be coupled to the upper and lower busbar housings 30 and 30'.

Figure 5C:
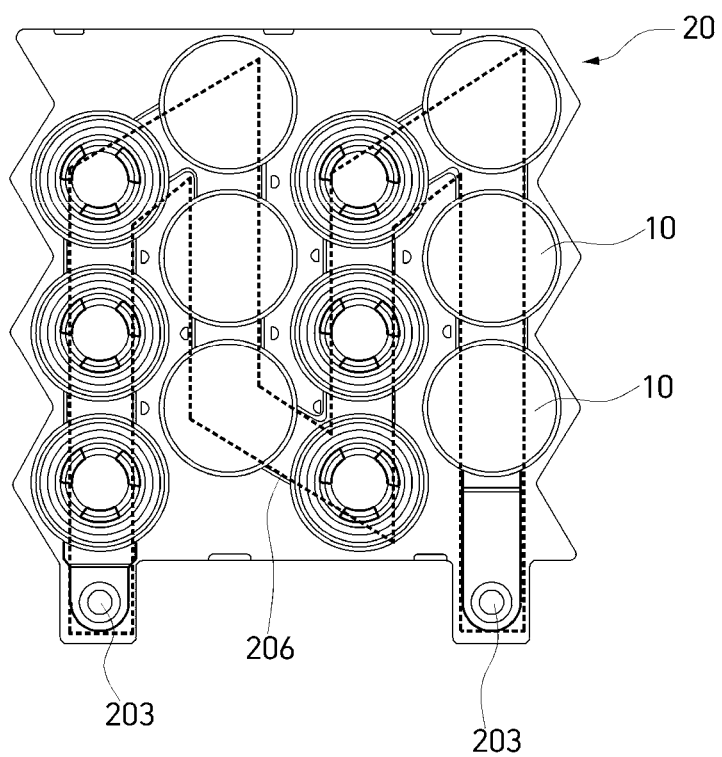
FIG. 5C is a view for describing grooves (205) which are formed in the upper cartridge (20) and the lower cartridge (20') and accommodate busbars connecting electrodes of the battery cells (10)

FIG. 5C is a view for describing grooves 205 which are formed in the upper surface of the upper cartridge 20 and the lower surface of the lower cartridge (20') and accommodate the busbars (which will be described below) connecting the electrodes of the battery cells 10. In the present embodiment, the battery module having one of various voltage and current capacities may be formed by arranging the twelve battery cells 10 so that the positive (+) electrodes and the negative (−) electrodes are arranged to be vertically and variously positioned, and to this end, the busbars having various shapes are used. The grooves 205 formed in the upper surface of the upper cartridge 20 and the lower surface of the lower cartridge 20' may be formed in shapes capable of accommodating the busbars having various shapes regardless of a shape in which the battery cells 10 are arranged. In FIG. 5C, a virtual line 206 is drawn to illustrate that the grooves 205 are formed substantially in an "M" shape (dotted line). Since the grooves 205 having the shape may accommodate the busbars in any case in which the battery cells are connected, a means for various types of expandability is implemented, and by applying the grooves having such concept, a degree of a connection structure of the battery cells is improved.

Figure 6:
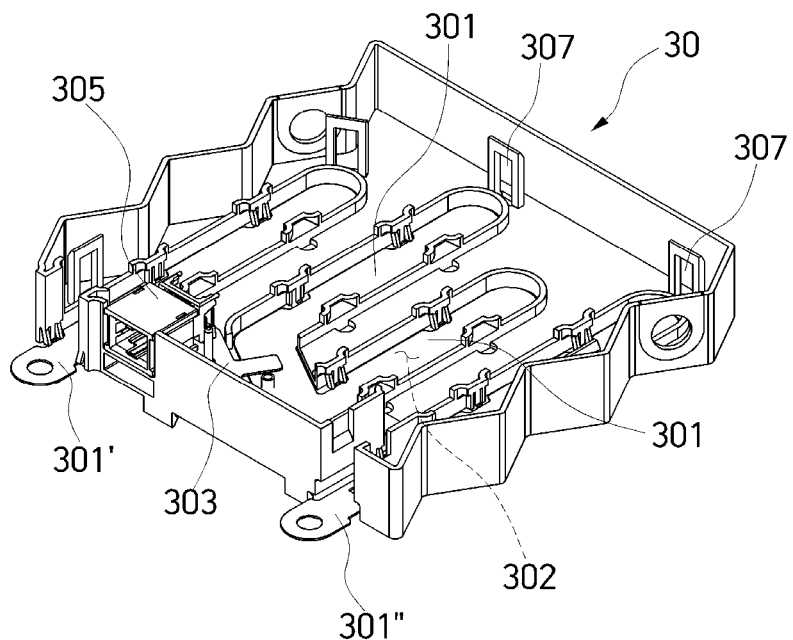
FIG. 6 is a detailed configuration diagram illustrating an upper busbar housing (30)

FIG. 6 is a detailed configuration diagram illustrating the upper busbar housing 30.

The upper busbar housing 30 is formed in a box shape and assembled on the upper cartridge 20 described above. In the box structure thereof, a busbar 301 in contact with electrodes exposed upward among the electrodes of the battery cells 10, a connector 305 for connecting a signal line between a circuit board (printed circuit board (PCB) or flexible PCB (FPCB) 303 for sensing a battery voltage and another external circuit, and the like are accommodated. In FIG. 6, the busbar 301 includes positive (+) and negative (−) end busbars 301' and 301" connected to the terminal blocks 203 illustrated in FIG. 3A.

In addition, the upper busbar housing 30 includes coupling parts 307 to be coupled to the upper cartridge 20. By coupling the coupling parts 211 formed on the upper cartridge 20 described above and the coupling parts 307 of the upper busbar housing 30, the upper busbar housing 30 is coupled to the upper cartridge 20. Due to the coupling parts, one touch snap hooking may be used.

Figure 7:
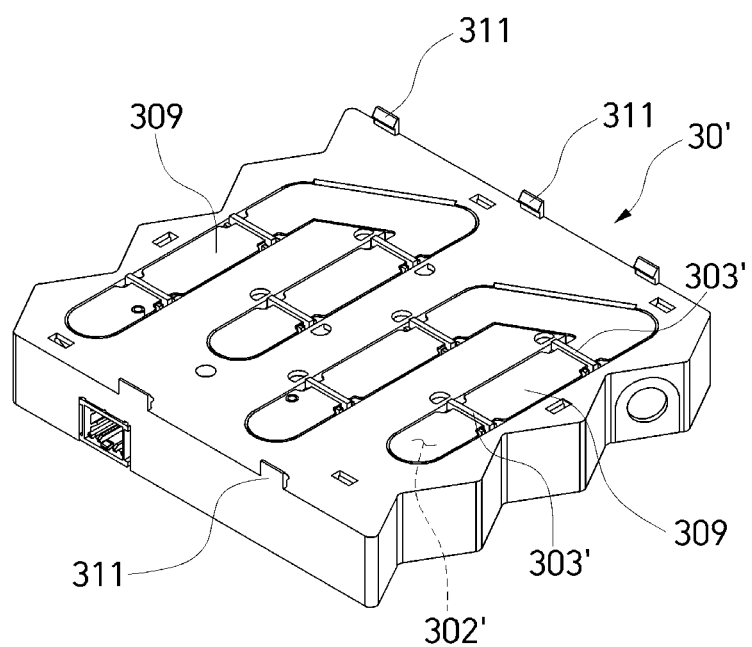
FIG. 7 is a detailed configuration diagram illustrating a lower busbar housing (30')

FIG. 7 is a detailed configuration diagram illustrating the lower busbar housing 30'. The lower busbar housing 30' is substantially similar to the structure of the upper busbar housing 30 except that the positive (+) and negative (−) end busbars 301' and 301" connected to the terminal blocks 203 illustrated in FIG. 6 are not present. That is, the lower busbar housing 30' is manufactured in a box shape similar to that of the upper busbar housing 30 and coupled under the lower cartridge 20'. In the box structure, a busbar 309 in contact with electrodes exposed downward among the electrodes of the battery cells 10 is basically included, and a connector for connecting a signal line between another circuit board for sensing a battery voltage and an external circuit may be selectively accommodated.

In addition, the lower busbar housing 30' also includes coupling parts 311 to be coupled to the lower cartridge 20'. By coupling the coupling parts 213 formed on the lower cartridge 20' described above and the coupling parts 311 of the lower busbar housing 30', the lower busbar housing 30' is coupled to the lower cartridge 20'. Due to the coupling parts, one touch snap hooking may also be used.

In FIG. 6 and FIG. 7, the busbar 301 is secured in a through path 302 (refer to FIG. 8 and FIGS. 9A and 9B) formed in the upper busbar housing 30, and similarly, the busbar 309 is secured in a through path 302' (refer to FIGS. 9A and 9B) formed in the lower busbar housing 30'. However, in FIGS. 6 and 7 which only show the busbars 301 and 309 with seated on the upper and lower busbar housings 30 and 30', the through paths 302 and 302' are not be seen because they are covered with the busbars 301 and 309.

Figure 8:
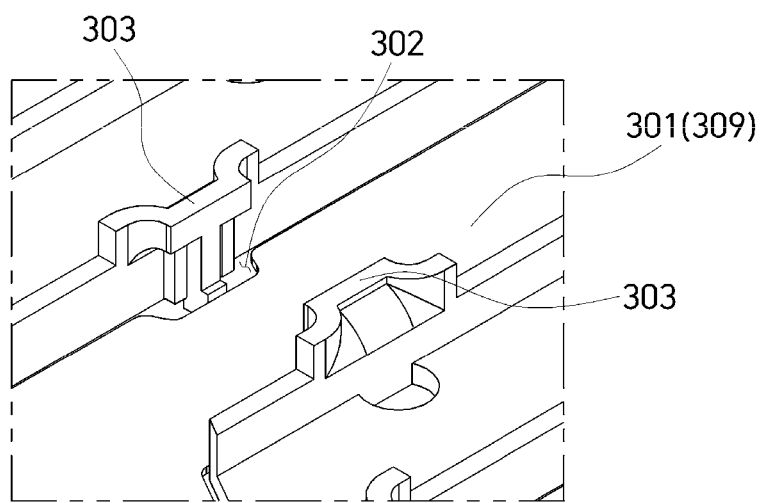
FIG. 8 is a view illustrating a seating structure of each of busbars (301, 309) of the upper and lower busbar housings (30, 30')

FIG. 8 is a view illustrating a seating structure of each of the busbars 301 and 309 of the upper and lower busbar housings 30 and 30'. The busbars 301 and 309 are conductors for implementing one of various currents and voltages by connecting the electrodes of the plurality (in the present embodiment, twelve) of battery cells 10 in one of various shapes. In order to seat the busbars 301 and 309, the busbars 301 and 309 are fitted or inserted into a plurality of busbar fixing holes 303 formed at predetermined intervals around through paths 302 and 302' formed in the upper and lower busbar housings 30 and 30'.

The busbar fixing holes 303 are shown in a lower surface of the upper busbar housing 30 as a boss type erected around the through path 302 at which the busbar is positioned in FIG. 8 and shown in an upper surface of the lower busbar housing 30' as a type of crossbars 303' which cross the through path 302' so that the busbar 309 is not separated from the through path in FIG. 7. However, the busbar seating structure is only one example, and when the busbar seating structure is actually implemented, a structure in which the busbars are seated on the busbar housings 30 and 30' may be designed in consideration of various shapes and principles.

Figure 9A:
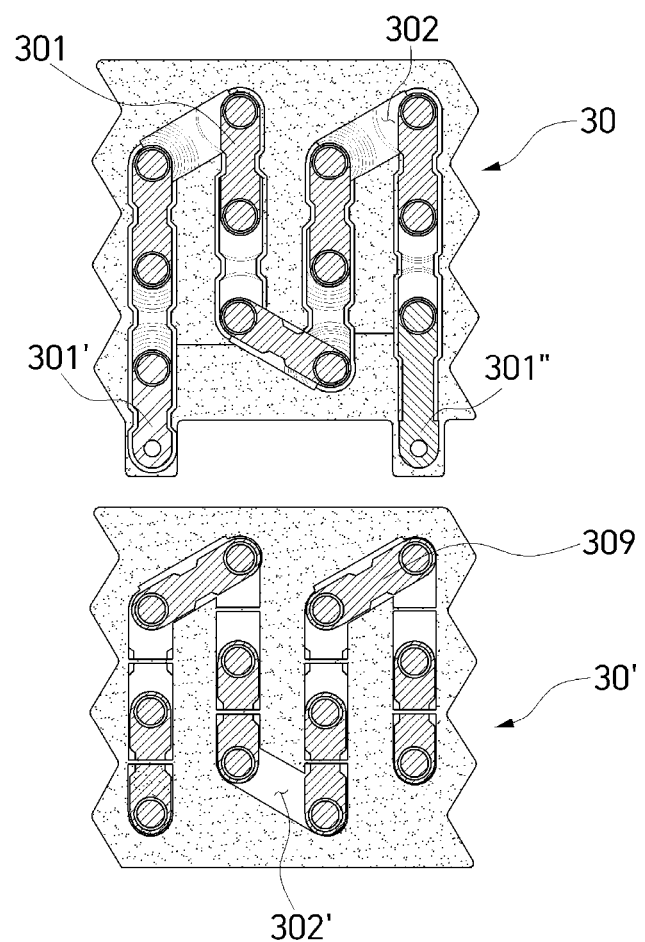
FIGS. 9A and 9B are exemplary views for describing a degree of design freedom for implementing various serial and parallel structures of an entire battery module by changing shapes of the busbars (301, 309) of the upper and lower busbar housings (30, 30')
Figure 9B:
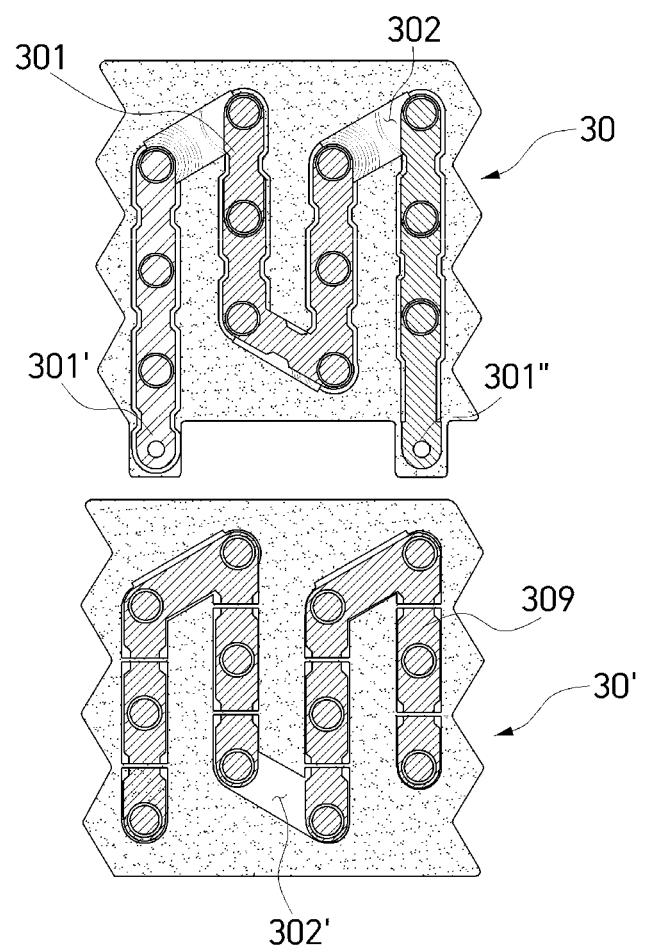

FIGS. 9A and 9B are exemplary views for describing that any serial and parallel structure of the entire battery module may be implemented by changing shapes of the busbars 301 and 309 of the upper and lower busbar housings 30 and 30'. FIG. 9A shows a shape and an arrangement of the busbars 301 and 309 of the upper busbar housing 30 and the lower busbar housing 30' for implementing a battery module having a twelve-series and one-parallel structure, and FIG. 9B shows a shape and an arrangement of the busbars 301 and 309 of the upper busbar housing 30 and the lower busbar housing 30' for implementing a battery module having a four-series and three-parallel structure.

As described above, the shape and the arrangement of the busbars 301 and 309 may be variously designed, and twelve battery cells may be combined so that a degree of freedom may be secured to implement a one-series and twelve-parallel, two-series and six-parallel, three-series and four-parallel, four-series and three-parallel, six-series and two-parallel, or twelve-series and one-parallel battery module.

Figure 10:
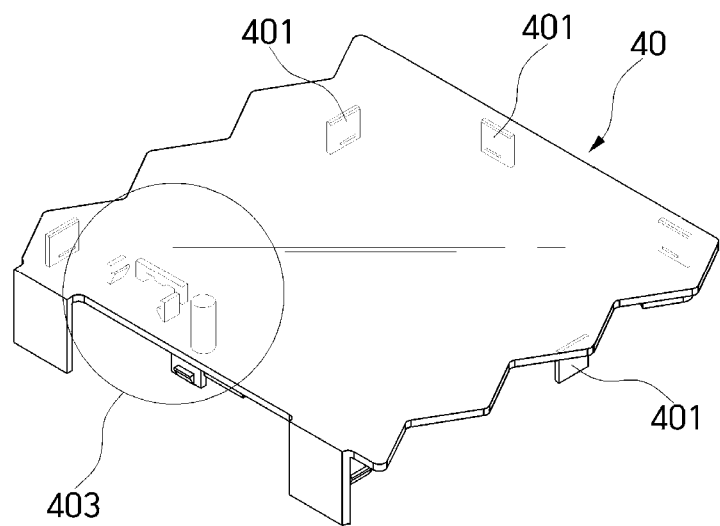
FIGS. 10 and 11 are detailed configuration diagrams illustrating an upper cover (40) and a lower cover (40')
Figure 11:
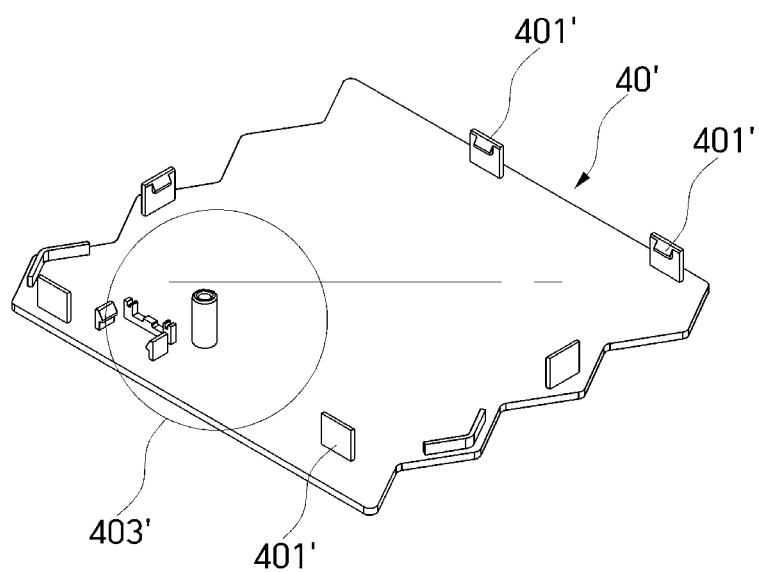

FIGS. 10 and 11 are detailed configuration diagrams illustrating the upper cover 40 and the lower cover 40'.

The upper cover 40 and the lower cover 40' are coupled to the upper and lower busbar housings 30 and 30' to prevent the busbar, the PCB (FPCB), the connector, the high voltage line, and the like from being exposed and to protect the busbar, the PCB (FPCB), the connector, the high voltage line, and the like.

Coupling parts 401 and 401' to be coupled to the upper and lower busbar housings 30 and 30' are formed on the upper cover 40 and the lower cover 40'. In addition, structures 403 and 403' which prevent movement of FPCB connectors illustrated in FIG. 6 are applied to the upper cover 40 and the lower cover 40'.

Figure 12A:
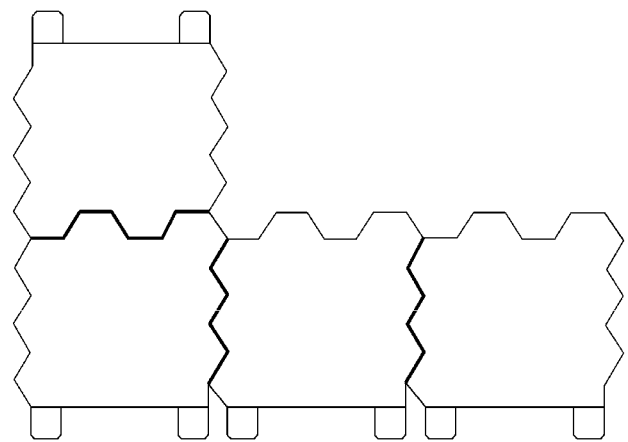
FIGS. 12A and 12B are exemplary plan views illustrating an arrangement state of a battery module assembly according to the present disclosure.
Figure 12B:
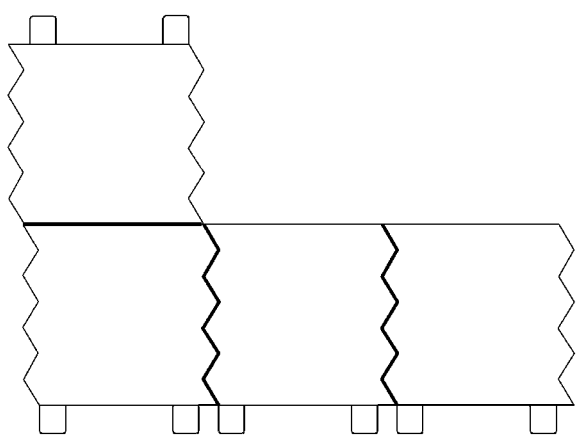

FIGS. 12A and 12B are plan views for describing an outer shape being designed to provide structural stability when a battery module assembly is arranged by matching outer shapes of battery modules according to the present disclosure.

FIG. 12A is an exemplary view illustrating a structure providing structural stability by designing side surfaces of the battery module assembly in a concave-convex shape and matching concave portions and convex portions of the side surfaces when a plurality of battery module assemblies are arranged, and FIG. 12B is an exemplary view illustrating a structure in which sides surfaces of the battery module assembly are designed to be flat to be in contact with and pressed against each other.

Effect of the disclosure: A battery module according to the present disclosure is a battery module, of which a degree of design freedom is improved, formed by applying a battery management system (BMS) separation type, cooling efficiency can be improved (increasing a heat exchange area) by forming a coolant path in side surfaces (cylindrical surfaces in the case of cylindrical batteries) of a plurality of battery cells in a transverse direction, and thus an additional heat pipe including a coolant can be omitted so that a cost is reduced.

In addition, due to a cartridge, a housing, and a cover formed of a synthetic resin, composite materials, or the like, a low weight and insulation performance can be secured.

A battery module having one of various voltage and current specifications can be manufactured so that a degree of design freedom is maximized by applying a busbar capable of implementing one-series and twelve-parallel, two-series and six-parallel, three-series and four-parallel, four-series and three-parallel, six-series and two-parallel, twelve-series and one-parallel, or the like to one single bus housing.

Although the present disclosure has been described in detail through the exemplary embodiments, it will be understood by those skilled in the art that the disclosure may be performed in specific forms different from the content disclosed in the present specification without changing the technological scope and essential features. The above-described embodiments should be considered as only examples in all aspects and not for purposes of limitation. In addition, it should be interpreted that the scope of the present disclosure is defined not by the detailed description but by the appended claims and encompasses all modifications and alterations derived from the scope and equivalents of the appended claims.

What is claimed is:

1. A battery module comprising:
   a first cartridge which is fitted onto first electrodes of arranged battery cells and fixes first parts of the battery cells;
   a second cartridge which is fitted onto second electrodes of the arranged battery cells and fixes second parts of the battery cells;
   a first busbar housing which is coupled to the first cartridge, wherein a first busbar electrically connected to the first electrodes of the battery cells is seated on the first busbar housing;
   a second busbar housing which is coupled to the second cartridge, wherein a second busbar electrically connected to the second electrodes of the battery cells is seated on the second busbar housing;
   a first cover which covers the first busbar housing to protect the battery cells, the first cartridge, and the first busbar housing; and
   a second cover which covers the second busbar housing to protect the battery cells, the second cartridge, and the second busbar housing,
   wherein:
   the battery cells include at least three groups, including a first group, a second group, and a third group, of battery cells, each of the three groups comprising multiple battery cells arranged in a first direction, the first, second, and third groups being consecutively arranged side-by-side in directions different from the first direction,
   the first cartridge includes at least three portions, including a first portion, a second portion, and a third portion, respectively accommodating the first, second, and third groups of battery cells,
   the first cartridge includes a first groove which extends in a surface positioned at side surfaces of the first electrodes of the battery cells, and the first busbar connecting the first electrodes of the battery cells is accommodated in the first groove, and
   the first groove is formed in the first direction in each of the first, second, and third portions of the first cartridge, and extends between the first and second portions of the first cartridge and between the second and third portions of the first cartridge.

2. The battery module of claim 1, wherein the battery cells include a plurality of cylindrical cells arranged in a transvers direction.

3. The battery module of claim 1, wherein the first cartridge and the second cartridge include pockets into which the battery cells are inserted to fix the battery cells.

4. The battery module of claim 1, wherein the first cartridge includes terminal blocks connected to positive (+) and negative (−) end electrodes, respectively, of the battery cells.

5. The battery module of claim 1, wherein the second cartridge includes a second groove which extends in side surfaces of the second electrodes of the battery cells, and the second busbar connecting the second electrodes of the battery cells is accommodated in the second groove.

6. The battery module of claim 1, wherein the first cartridge and the second cartridge include coolant paths which extend through side surfaces thereof and perform cooling in a transverse direction of the battery cells.

7. The battery module of claim 1, wherein the first cartridge and the second cartridge include position restriction parts which arrange positions of the first cartridge and the second cartridge when the first cartridge and the second cartridge are coupled.

8. The battery module of claim 1, wherein the first cartridge and the second cartridge include coupling parts to be coupled to the first busbar housing and the second busbar housing, respectively.

9. The battery module of claim 1, wherein the first busbar housing and the second busbar housing respectively include:
   through paths disposed in regions on which the first and second busbars of the first and second busbar housings are respectively seated; and
   a plurality of busbar fixing holes defined around the through paths,
   wherein the first and second busbars are positioned in the through paths and inserted into and seated in the plurality of busbar fixing holes.

10. The battery module of claim 1, wherein the first cover and the second cover include coupling parts to be coupled to the first busbar housing and the second busbar housing, respectively.

11. The battery module of claim 1, wherein:
    a side surface of the battery module has a concave-convex shape; and
    a concave portion of the concave-convex shape of the battery module matches with a convex portion of the concave-convex shape of another battery module when a plurality of battery modules are arranged.

12. The battery module of claim 1, wherein:
    a side surface of the battery module has a flat surface; and
    the side surface of the battery module, having the flat surface, is in contact with a side surface of another battery module, having a flat surface, when a plurality of battery modules are arranged.

13. A battery module comprising:
    one or more cartridges which are fitted onto arranged battery cells to fix the battery cells;

one or more busbar housings which are coupled to the cartridges and on which busbars electrically connected to electrodes of the battery cells are seated; and one or more covers which cover the busbar housings to protect the battery cells, the cartridges, and the busbar housings, wherein:

the battery cells include at least three groups, including a first group, a second group, and a third group, of battery cells, each of the three groups comprising multiple battery cells arranged in a first direction, the first, second, and third groups being consecutively arranged side-by-side in directions different from the first direction, each of the cartridges includes at least three portions, including a first portion, a second portion, and a third portion, respectively accommodating the first, second, and third groups of battery cells, each of the cartridges includes a groove which extends in side surfaces of the electrodes of the battery cells, and the respective busbar connecting the electrodes of the battery cells is accommodated in the groove, and the groove is formed in the first direction in each of the first, second, and third portions of each of the cartridges, and extends between the first and second portions of each cartridge and between the second and third portions of each cartridge.

14. The battery module of claim 13, wherein the battery cells include a plurality of cylindrical cells arranged in a transverse direction.

15. The battery module of claim 13, wherein each of the cartridges includes a coolant path which extends a side surface thereof and performs cooling in a transverse direction of the arranged battery cells.

16. The battery module of claim 13, wherein each of the busbar housings includes:

a through path disposed in a region in which the respective busbar is seated; and a plurality of busbar fixing holes defined around the through path, wherein the respective busbar is positioned on the through path and is inserted into and seated in the plurality of busbar fixing holes.

17. The battery module of claim 13, wherein:

a side surface of the battery module has a concave-convex shape; and a concave portion of the concave-convex shape of the battery module matches with a convex portion of the concave-convex shape of another battery module when a plurality of battery modules are arranged.

18. The battery module of claim 13, wherein:

a side surface of the battery module has a flat surface; and the side surface of the battery module, having the flat surface, is in contact with a side surface of another battery module, having the flat surface, when a plurality of battery modules are arranged.

* * * * *